US008490344B1

(12) United States Patent
Chen et al.

(10) Patent No.: US 8,490,344 B1
(45) Date of Patent: Jul. 23, 2013

(54) GREENHOUSE SHELF STRUCTURE WITH MODULARIZED SOLAR POWER FACILITY

(75) Inventors: Kuei-Kuang Chen, Taipei (TW); Szu-Hai Lin, Hsinchu (TW); Jun-Hao Chen, Taipei (TW)

(73) Assignee: Sunny Rich Power Co., Ltd., Taipei (TW)

( * ) Notice: Subject to any disclaimer, the term of this patent is extended or adjusted under 35 U.S.C. 154(b) by 0 days.

(21) Appl. No.: 13/453,412

(22) Filed: Apr. 23, 2012

(30) Foreign Application Priority Data

Feb. 10, 2012 (TW) .............................. 101202407 A

(51) Int. Cl.
*E04D 13/18* (2006.01)
*E04H 14/00* (2006.01)

(52) U.S. Cl.
USPC ...................... 52/173.3; 52/DIG. 17; 52/302.3

(58) Field of Classification Search
USPC ........ 52/11, 13, 173.3, 302.1, 302.3, DIG. 17
See application file for complete search history.

(56) References Cited

U.S. PATENT DOCUMENTS

| 739,559 | A | * | 9/1903 | Rinker | 52/13 |
| 4,837,990 | A | * | 6/1989 | Peleg | 52/63 |
| 5,809,701 | A | * | 9/1998 | Vollebregt | 52/13 |
| 6,041,555 | A | * | 3/2000 | Alpi | 52/11 |
| 6,092,347 | A | * | 7/2000 | Hou | 52/648.1 |
| 6,189,272 | B1 | * | 2/2001 | Deiss et al. | 52/236.3 |
| 7,007,429 | B2 | * | 3/2006 | Kim | 52/16 |
| 7,240,458 | B2 | * | 7/2007 | Ishisaki | 52/2.22 |
| 2009/0151269 | A1 | * | 6/2009 | Eiger et al. | 52/11 |
| 2009/0223142 | A1 | * | 9/2009 | Shingleton et al. | 52/71 |

* cited by examiner

*Primary Examiner* — Brian Glessner
*Assistant Examiner* — Brian D Mattei
(74) *Attorney, Agent, or Firm* — Chun-Ming Shih

(57) ABSTRACT

A greenhouse shelf structure with modularized solar power facility includes a greenhouse shelf set between two neighboring standing pillars. The greenhouse shelf is a wave form shelf or a ridge form shelf. The standing pillar connects to a connector, and the side end of the connector connects the greenhouse shelf. The top of the connector connects a solar panel support. Accordingly, the solar panel support and the greenhouse shelf are integrated into a whole assembly by the modularized combination, and the place where the greenhouse situated can also be provided with a solar panel to receive the solar power to generate the electricity, which further fulfills the electricity requirement of the greenhouse or other devices.

4 Claims, 9 Drawing Sheets

GREENHOUSE SHELF STRUCTURE WITH MODULARIZED SOLAR POWER FACILITY

BACKGROUND

1. Technical Field

The present invention relates to a greenhouse shelf, especially to a greenhouse shelf structure with a modularized solar power facility.

2. Related Art

The greenhouse is an agricultural house used to cultivate plants or farm crops. The greenhouse is suitable to be set up in city, remote village or high latitude mountain area. The common greenhouse forms a covering by using a plurality of support shelves, and insect-catching net, transparent glass, transparent plastic plate or shutters can be covered on the top or periphery of the greenhouse, and the plants in the greenhouse can directly be irradiated by the sunlight, which enables the plants to do the photosynthesis. Meanwhile, the greenhouse can also slow down or isolate the outside and inside air convection, warm up the temperature, air, water, and the soil in the greenhouse, which further forms an environment suitable for plant growing.

When using greenhouse to cultivate plants or crops, electricity facility, such as cultivation lights, water sprinkler or fan is often required. However, the electricity is not easy to acquire when the green house is situated in a remote village or high latitude mountain area. Besides, no matter the greenhouse is in the city, remote village, or mountain area, the value of the land where the greenhouse is situated can be increased if a natural energy generating facility can be added on the greenhouse. Therefore, combing the greenhouse and the solar power facility becomes an important issue.

The conventional greenhouse shelf is not designed for combining with the solar power facility, and the shelf is only strong enough to isolate the rain and wind. The solar power facility can not be arranged on the conventional greenhouse shelf, especially the solar power facility built up with the solar panel. Until now, the aforementioned issue remains unsolved.

BRIEF SUMMARY

The present invention aims at improving the problem that the solar panel facility can not be built up on the conventional greenhouse shelf, and further providing a greenhouse shelf structure with modularized solar power facility. The present invention includes a greenhouse shelf set between two neighboring standing pillars; the standing pillar connects a connector; the greenhouse shelf connects the connector to be further set between the two neighboring standing pillars, and the top of the connector is formed a solar panel support.

In the detail embodiment, the greenhouse shelf is a wave form shelf or a ridge form shelf. When the greenhouse shelf is a wave form shelf, a covering is fixed to the wave form shelf to form the top covering. The top of the connector is provided with a water collecting trough which has a trough opening opened upward. The side of the connector is provided with a drain trough, and an aqueduct connects the water collecting trough and the drain trough, or the bottom of the water collecting trough connects a drain pipe which penetrates the connector and extends to the ground.

An outer side end of the connector connects a side shelf support, and the outer side end is situated in the periphery of the greenhouse shelf structure. The solar panel support is formed by connecting the top of the connector, or the solar panel support is formed by extending from the top of the standing pillar to form the top of the connector. The solar panel is built on a solar panel support, and the solar panel is solar tracking type or fixation type.

A sliding platform used for maintenance is slidably provided between the solar panel and the solar panel support. When the greenhouse shelf is a ridge form shelf, the ridge form shelf is provided with a plurality of glass plates. A water collecting trough is provided between the standing pillar and the top of the connector, and the water collecting trough has a trough opening opened upward and connecting one end of the ridge form shelf.

The advantage of the aforementioned structure is: the solar panel support and the greenhouse shelf are integrated into a whole assembly by the modularized combination, and the place where the greenhouse situated can also be provided with a solar panel to receive the solar power to generate the electricity, which further fulfills the electricity requirement of the greenhouse or other devices. Besides, by using the characteristic of modularization, the area of the greenhouse can vary on demand, which can further increase the value of the land where the greenhouse is situated, and the strength of the sunlight can be regulated or increases the electricity generating by changing the direction of the solar panel.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
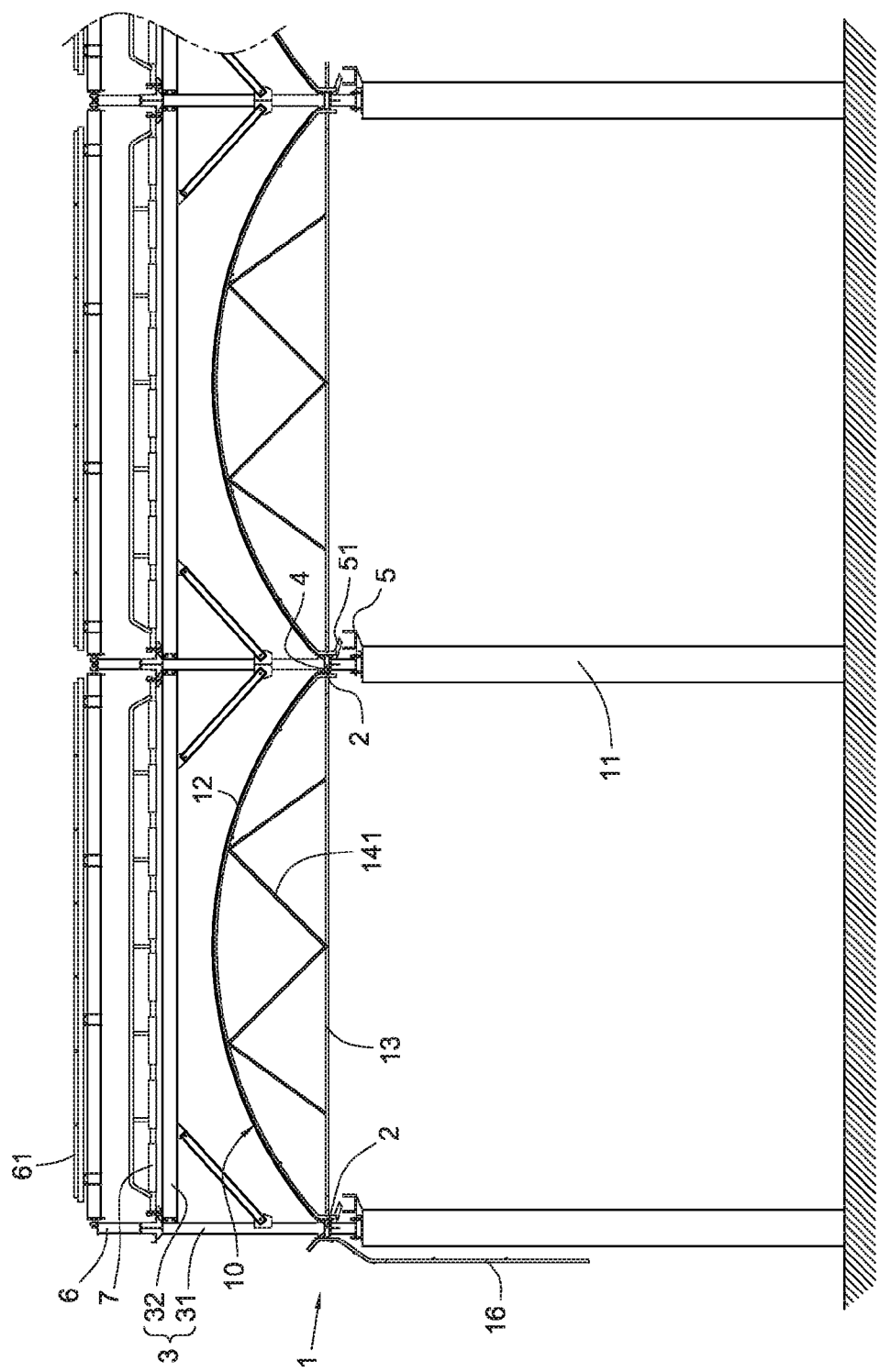
FIG. 1 is a front view of the wave form shelf according to the present invention.
Figure 2:
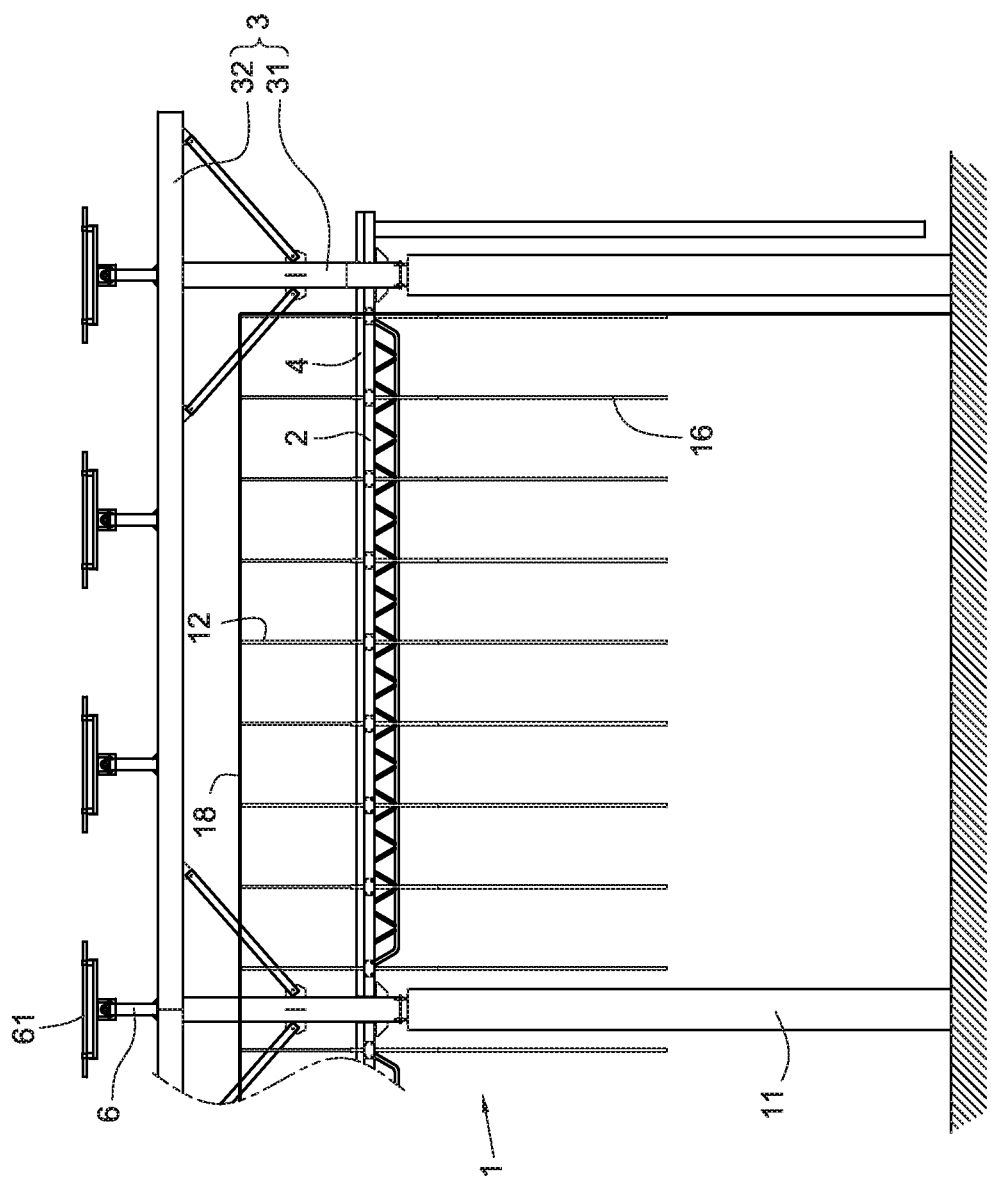
FIG. 2 is a side view of the FIG. 1.
Figure 6:
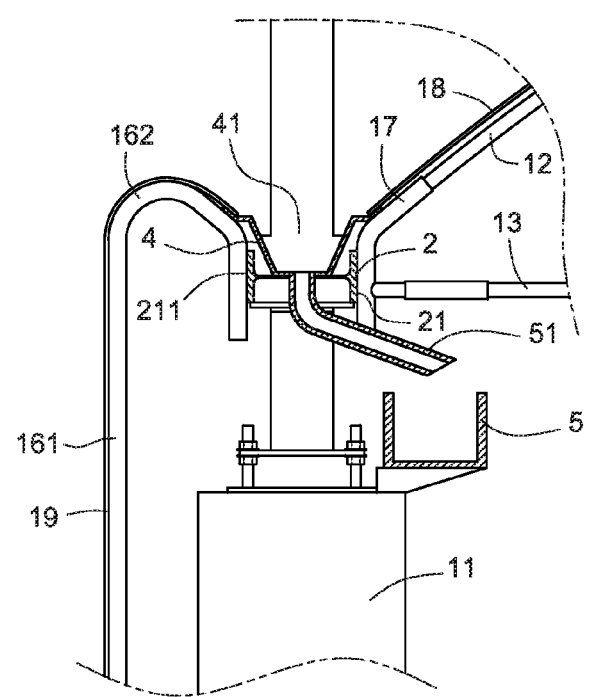
FIG. 6 is schematic diagram of another embodiment of the side shelf support of the FIG. 5.

Please refer to FIGS. 1 and 2, which are the front view and the side view of the wave form greenhouse shelf according to the present invention, respectively. The greenhouse shelf structure of the present invention includes a greenhouse shelf set between two neighboring standing pillars 11. The greenhouse shelf is substantially a wave form shelf 10 which consisted of an arc shape support 12 rose upward and a level support 13 under the arc shape support 12. The wave form shelf 10 can be set between two neighboring standing pillars 11 by using the arc shape support 12 and the level support 13, and the wave form shelf 10 can be fixed a covering 18 (as shown in FIG. 6), thereby forming the top covering of greenhouse 1.

Figure 3:
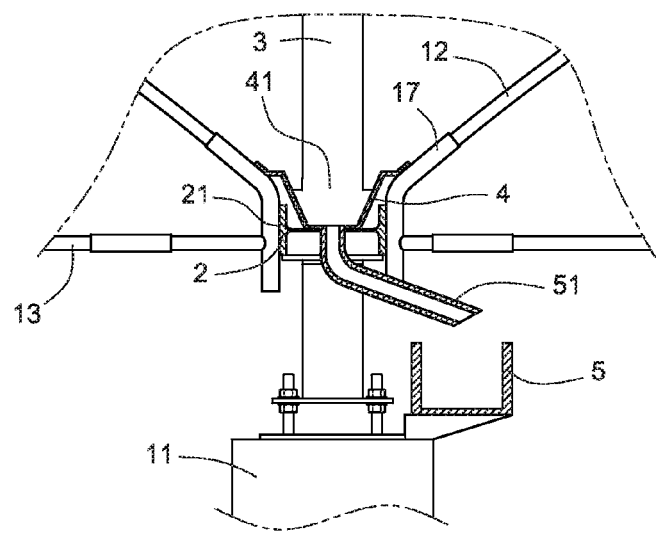
FIG. 3 is a schematic diagram of a partially amplified connector of FIG. 1.

More specifically, the top of the standing pillar 11 can be fixed to a connector 2 via screwing, soldering or any other means. The wave form shelf 10 connects the connector 2 and further set between the two standing pillars 11. In addition, the standing pillar 11 uses the side end 21 of the connector 2 to connect the arc shape support 12 and one end of the level support 13, respectively. Besides, the top of the connector 2 forms upward a solar panel support 3. The connector 2 is in a strip shape, which is set between the top of the two neighboring standing pillar 11, and one end of the connector 2 connects one end of the arc shape shelf 12 via an intermediary connector 17 (as shown in FIG. 3). The intermediary connector 17 is formed toward the inclined upward direction, and fixed to the side end of the connector 2 by the way of screwing, soldering, or any other means. Furthermore, there are a plurality of support poles 141 connected between the arc shape shelf 12 and the level support 13, and the support pole 141 is fixed to a target in an inclined manner, which can be a stress dispersing connecting pole between the arc shape shelf 12 and the level support 13. In the present embodiment, the standing pillar 11 can be a H shape steel, a square tube or a round tube, and the connector 2 can also be a H shape steel or a square tube.

The top of the connector 2 is provided with a concave water collecting trough 4 (as shown in FIG. 3), and the water collecting trough 4 has a trough opening 41 opened upward. The side of the connector 2 is provided with a drain trough 5 at the lower place. An aqueduct 51 connects between the water collecting trough 4 and the drain trough 5. Thus, when the rain falls on the top covering consisted of the wave form shelf 10, the rain will be guided into the water collecting trough 4, and further being drained to outside or the ground via the aqueduct 51 and drain trough 5, thereby preventing water accumulation at the lower place of the top covering.

Figure 10:
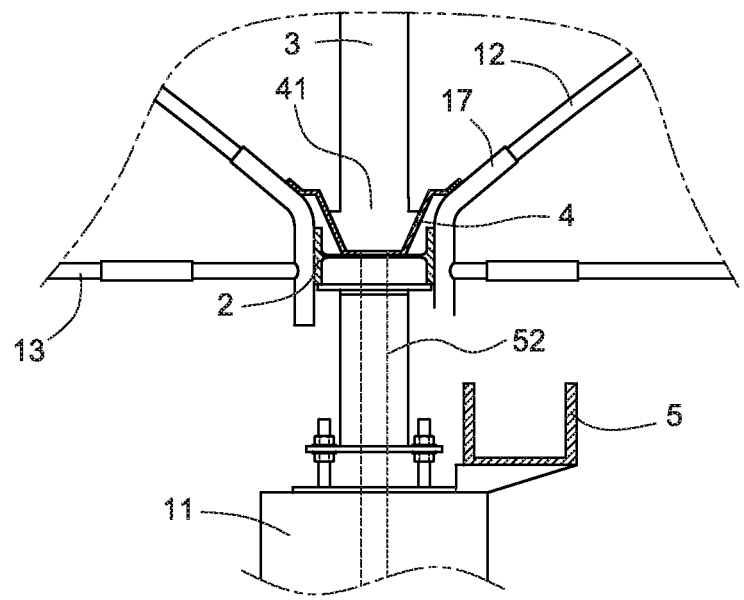
FIG. 10 is a schematic diagram of another embodiment of a partially amplified water collecting trough of the FIG. 1.

The way to guide the rain can be altered to connect a drain pipe 52 to the bottom of the water collecting trough 4, and the drain pipe 52 penetrates the connector 2, the solar panel support 3, the standing pillar 11 and extends downward to the ground (as shown in FIG. 10).

Figure 5:
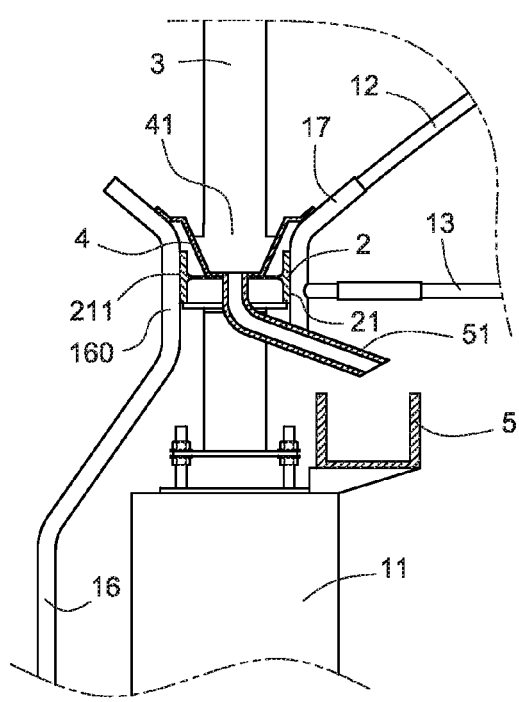
FIG. 5 is a schematic diagram of a partially amplified side shelf support of the FIG. 1.

The outer side end 211 of the connector 2 of the standing pillar 11 on the side of the greenhouse 1 connects a side shelf support 16 (as shown in FIG. 5). The shelf structure of the side shelf support 16 has a concave portion 160, and the side shelf support 16 extends downward to the suitable position form the concave portion 160. The concave portion 160 can be fixed to the outer side end 211 of the connector 2 via screwing, snapping or any other means. The outer side end 211 is situated around the periphery of the wave form shelf structure, and thereby arranging a windshield curtain 19 (or any other insect-catching net, transparent glass, transparent plastic plate or shutters) on the side shelf support 16. The windshield curtain 19 can hang down to the ground (as shown in FIG. 6) to be a side wall. The side wall can further construct the side covering of the greenhouse. The periphery of the side shelf support 16 can also not be arranged with the side wall, and further forming an open space greenhouse which has good air circulation.

The way of fixing the covering 18 on the wave form shelf 10 and fixing the windshield curtain 19 on the side shelf support 16 are using an existing layering to snap the covering 18 or the windshield 19 to a snapping hole. People skilled in the art can easily realize to use binding, nailing, or any other alternative ways to fix the covering 18 and the windshield curtain 19 to the wave form shelf 10 and side shelf support 16.

The side shelf support 161 can also be altered to a bending portion 162 (as shown in FIG. 6) which bends toward the outer side of the greenhouse, and further extends downward to the ground. By way of this, a drain passage which easily drains the rain can be kept between the side shelf support 16 and the top covering when the side covering is fixed to the side shelf support 16. The side shelf support 16, 161 shown in FIGS. 5 and 6, and the concave portion 160 or the bending portion 162, can be connected to each other by segment.

The solar panel support 3 is formed by connecting to the top of the connector 2 (as shown in FIG. 3). More specifically, The solar panel support 3 is provided with a plurality of standing support 31, and a plurality of horizontal support 32 which set between the standing support 31 (as shown in FIG. 1). In the present invention, the standing support 31 is used to connect the solar panel support 3 to the top of the connector 2.

The solar panel support 3 can also be formed by the extension portion of the standing pillar 11. More specifically, the extension portion of the standing pillar 11 can be the standing support 31.

Figure 4:
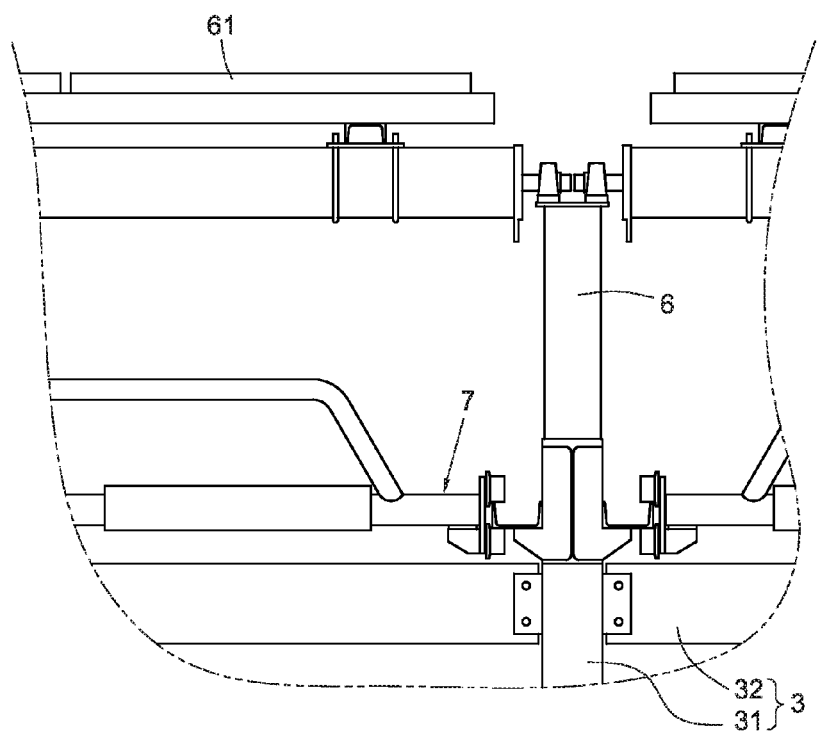
FIG. 4 is a schematic diagram of a partially amplified solar panel support and the solar power facility of the FIG. 1.
Figure 7:
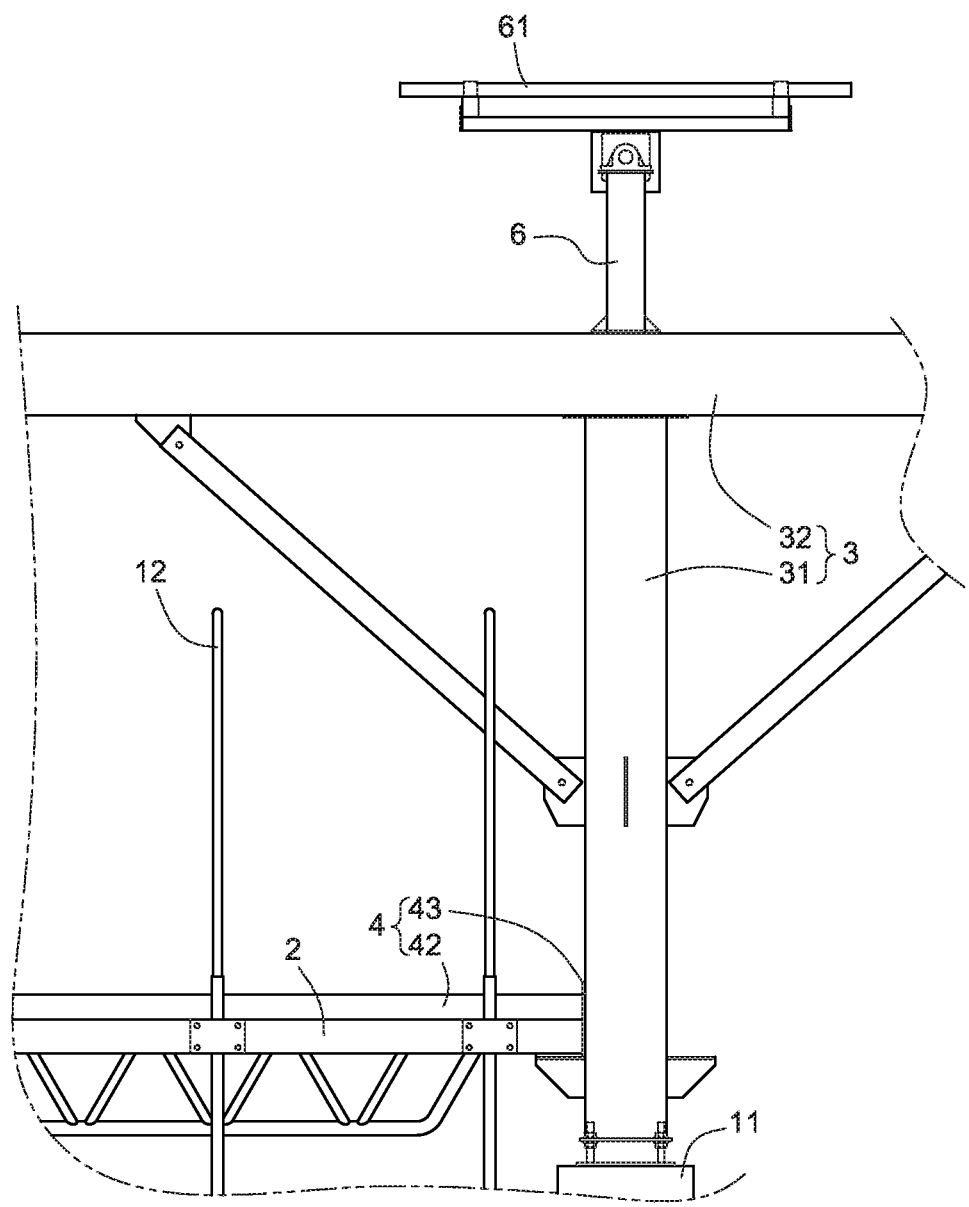
FIG. 7 is a schematic diagram of a partially amplified standing pillar and the connector of the FIG. 2.

By using the aforementioned structure, a solar power facility can be built on the solar panel support 3 (as shown in FIGS. 4 and 7), which includes using a plurality of solar-tracking supporting shelves 6 to accommodate the solar panel 61, and placing the solar panel 61 horizontally on the solar panel support 3, or making the solar panel 61 to turn the direction to face the sunlight with the moving of the sun.

Figure 8:
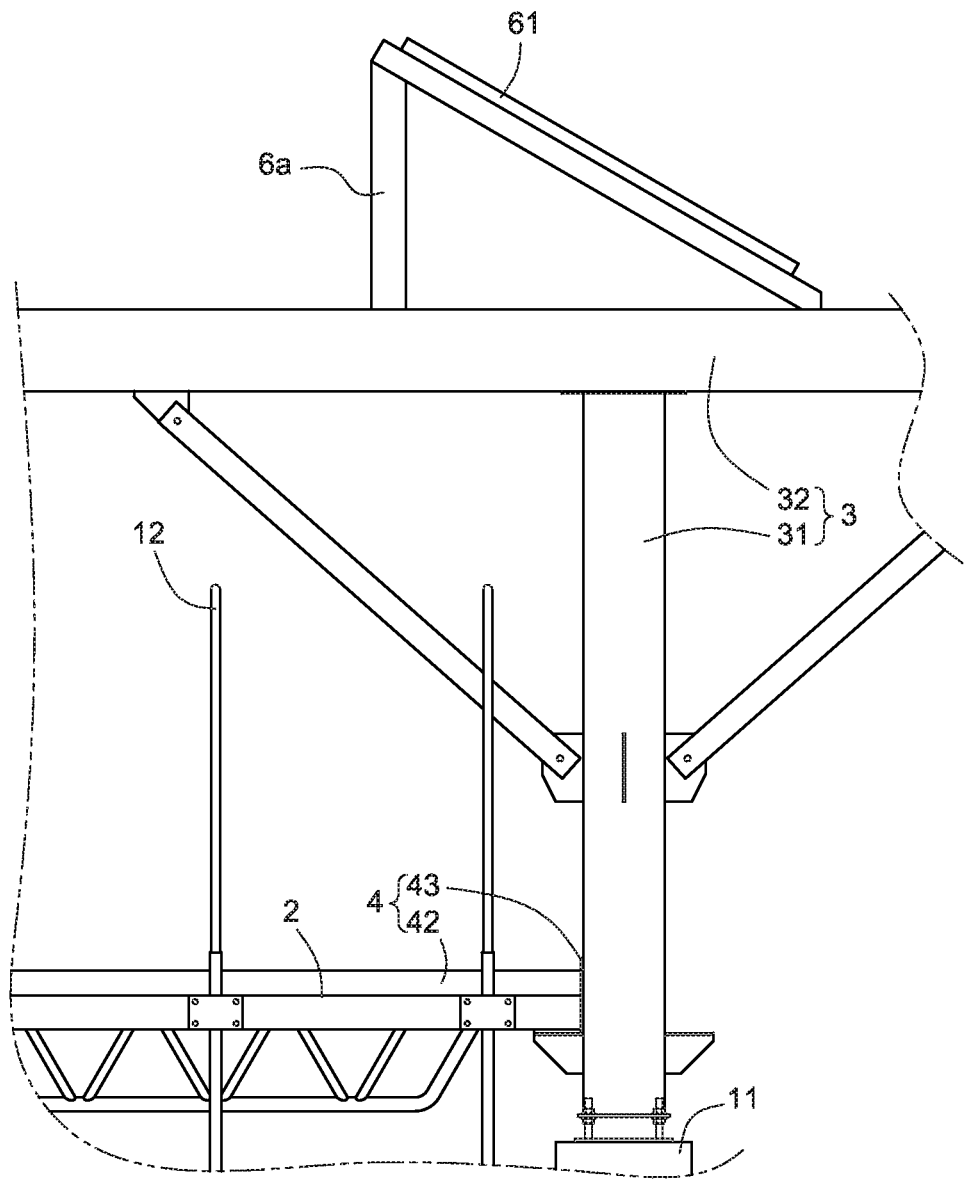
FIG. 8 is a schematic diagram of another embodiment of the FIG. 7.
Figure 9:
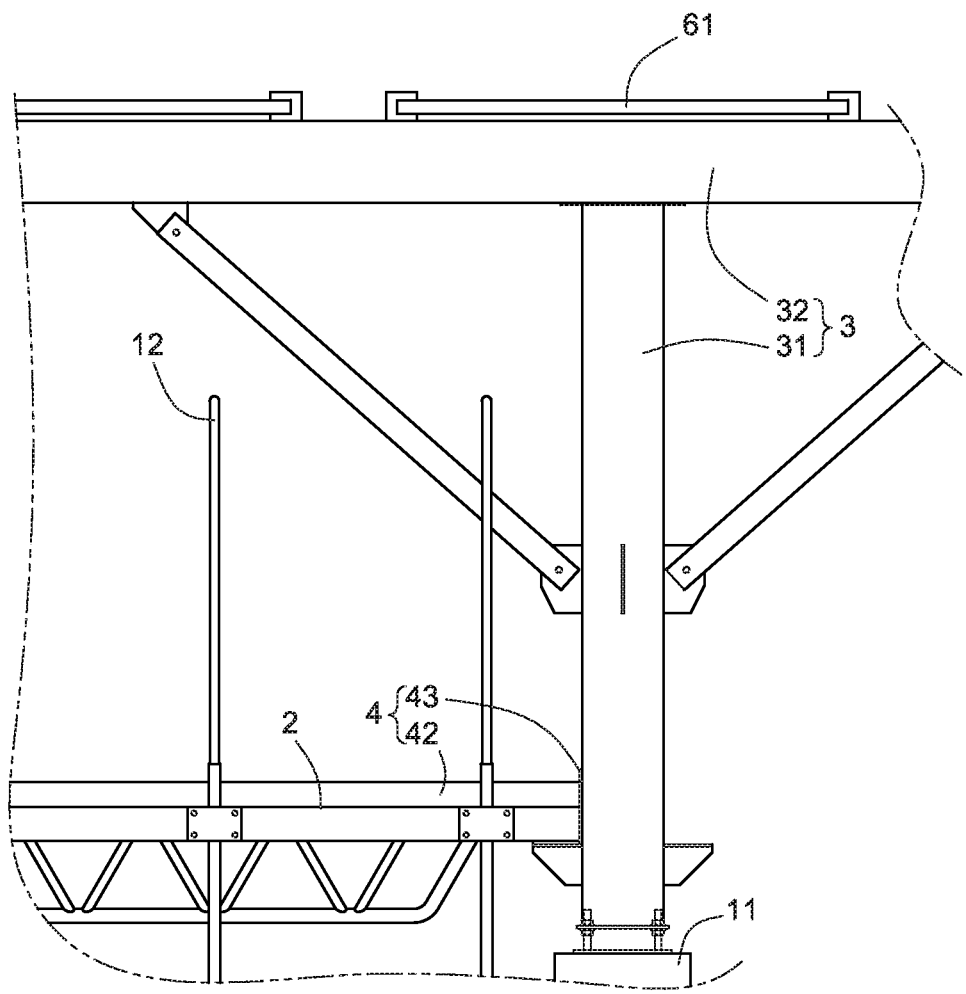
FIG. 9 is a schematic diagram of still another embodiment of the FIG. 7.

In another embodiment of the present invention, a supporting shelf 6a is made to a inclined type which is fixed to a direction facing the sun (as shown in FIG. 8). The solar panel 61 is laid on the supporting shelf 6a to face the sunlight, or the solar panel 61 can directly being laid on the horizontal support 32 (as shown in FIG. 9).

Besides, a sliding platform 7 is slidably provided between the solar panel 61 and the solar panel support 3. More specifically, the sliding platform 7 is slidably provided between the solar panel 61 and the horizontal support 32. "Slidably providing" means arranging a fixed track on the horizontal support 32, and also arranging rollers around the periphery of the sliding platform 7. By the guiding of the track, the rollers can roll to force the sliding platform 7 to move along the track. People can lie down or sit on the sliding platform 7 to maintain the top covering of the greenhouse or the solar power facility.

The standing pillar 11, connector 2, standing support 31, and the horizontal support 32 can also be made by a light weight material, such as aluminum. The arc shape support 12, the level support 13, the support pole 141, the side shelf support 16, and the intermediary connector 17 can also be made by metal tube or metal rod.

Figure 11:
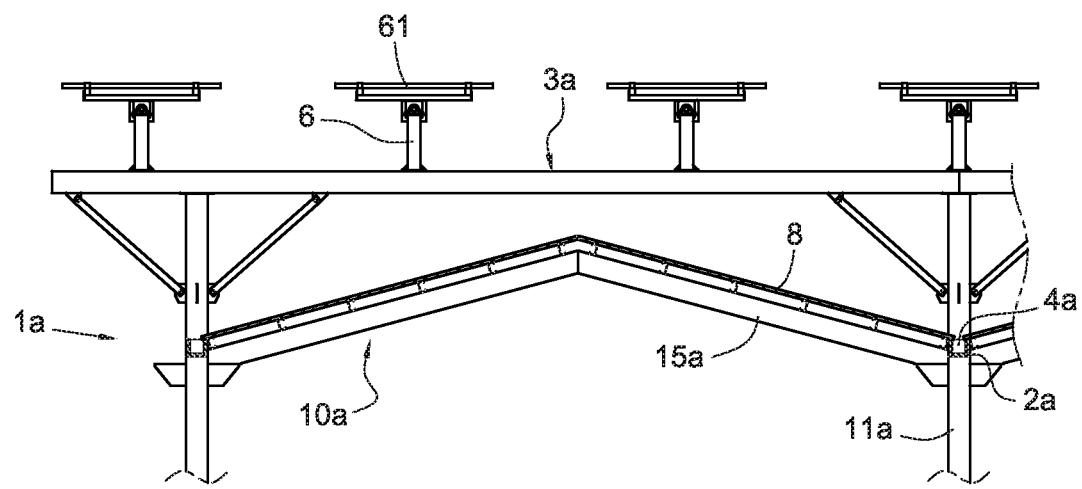
FIG. 11 is a schematic front view of the partially amplified ridge form shelf according to the present invention.
Figure 12:
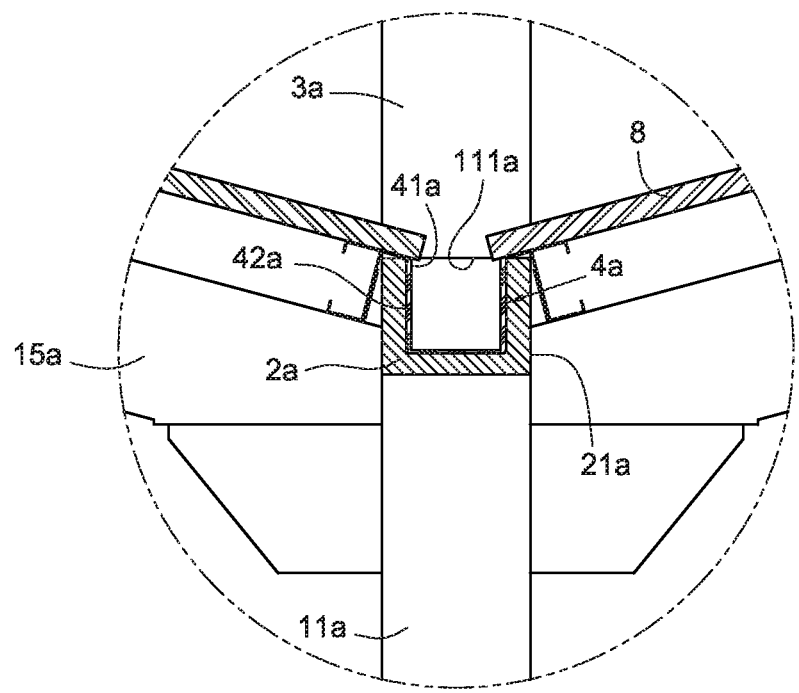
FIG. 12 is a schematic diagram of another embodiment of a partially amplified water collecting trough of the FIG. 11.

Please refer to FIGS. 11 and 12, which are the front view and side view of a ridge form shelf 10a according to the present invention. The difference between the ridge form shelf and the wave form shelf is: In the greenhouse 1a, the ridge form shelf 10a is set between the top of the two neighboring standing pillars 11; more specifically, a ridge form shelf 10a is consisted of a pair of inclining support 15a bulging upward and having an angle, and the top of the inclining support 15a is provided with a plurality of transparent or semi-transparent glass plate 8. The ridge form shelf 10a is covered with glass plate 8 to form the top covering of the greenhouse 1a. A standing pillar 11a connects a connector 2a, and a side end 21a of the connector 2a connects one end of the inclining support 15a, and the top of the connector 2a connects upward with a solar panel support 3a.

A water collecting trough 4a is provided between the standing pillar 11 and the top of the connector 2a, and the water collecting trough 4a has a trough opening 41a opened upward and connecting one end of the inclining support 15a. The water collecting trough 4a has a concave plate 42a provided on the top of the connector 2a, and a gateway 111a which is provided to being passed by the concave plate 42a is formed at the position where the top side wall of the standing pillar 11a near the connector 2a. By such arrangement, the water can flow among all the standing pillar 11a along the concave plate 42a, and the water can be guided to be drained to the ground by using the aqueduct.

Practically, the two outer side walls of the gateway 111a of the standing pillar 11a which made of H shape steel or square tube can further combined with floor plate to strengthen the structure. The standing pillars 11a in the periphery of the ridge form shelf 10a can also be arranged transparent glass plates to be the outer wall of the greenhouse 1a. Part of the walls can be arranged yarn nets to facilitate the air convection, or arranging another PE windshield curtain on the outer of the ridge form shelf 10a to prevent the strong wind to influence the temperature and the humidity inside the greenhouse 1a. Except the aforementioned features, all the other embodiments of ridge form shelf 10a and the wave form shelf 10 are the same.

By the aforementioned method, the solar panel support 3 and the greenhouse shelf are integrated into a whole assembly by the modularized combination, and the place where the greenhouse situated can also be provided with a solar panel 61 to receive the solar power to generate the electricity, which further fulfills the electricity requirement of the greenhouse or other devices. Besides, by using the characteristic of modularization, the area of the greenhouse can vary on demand, which can further increase the value of the land where the greenhouse is situated, and the strength of the sunlight can be regulated or increases the electricity generating by changing the direction of the solar panel 61.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A greenhouse shelf structure with modularized solar power facility, comprising a greenhouse shelf being set between two neighboring rows of standing pillars, wherein:
    each standing pillar of one row of the standing pillars connects to a connector beam, a greenhouse shelf frame connects between two connector beams, and the greenhouse shelf frame includes an arc shape support and a level support connected to the connector beam via an intermediary connector and a plurality of support poles connected between the arc shape support and the level support;
    a solar panel supporting frame is installed on the greenhouse shelf, the support frame includes a plurality of standing supports each extending from the top of each of the standing pillars, and a plurality of horizontal supports each connected between two adjacent standing supports; and
    a solar power device is set on the solar panel support, which includes a solar-tracking supporting shelf and a plurality of solar panels accommodated thereon, and a sliding platform used for maintenance is slidably provided between the solar-tracking supporting shelf and the horizontal supports so that a user can lie down or sit on the sliding platform to maintain the greenhouse shelf or the solar power device.

2. The greenhouse shelf structure according to claim 1, wherein a water collecting trough is provided on the top of the connector beam, and the water collecting trough having a trough opening opened upward.

3. The greenhouse shelf structure according to claim 2, wherein a drain trough is provided on the side of the connector beam, and an aqueduct connects the water collecting trough and the drain trough.

4. The greenhouse shelf structure according to claim 1, wherein an outer side end of the connector beam connects a side shelf support, and the outer side end of the connector is positioned around the periphery of the greenhouse shelf.

* * * * *